US008560028B1

(12) United States Patent
Mulbrook

(10) Patent No.: US 8,560,028 B1
(45) Date of Patent: Oct. 15, 2013

(54) ANTENNA FUNCTIONALITY MANAGEMENT ROUTER CONTROLLING THE TRANSMIT-RECEIVE MODES OF MULTIPLE ANTENNAS

(75) Inventor: Mark A. Mulbrook, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 23 days.

(21) Appl. No.: 12/842,543

(22) Filed: Jul. 23, 2010

(51) Int. Cl.
*H04M 1/00* (2006.01)

(52) U.S. Cl.
USPC .................... 455/575.7; 455/63.4; 455/562.1; 455/25; 455/420; 455/552.2; 370/310.2; 370/316; 370/338; 370/323; 375/144; 343/702; 343/745

(58) Field of Classification Search
USPC .......... 455/575.7, 562.1, 431, 432.1, 427, 25, 455/420, 422.1, 552.2, 41.2, 500, 522, 63.4, 455/67.11, 509, 456.2, 456.5, 561; 370/331, 328, 334, 316, 310, 310.2, 370/323, 338; 375/144; 343/702, 745
See application file for complete search history.

(56) References Cited

U.S. PATENT DOCUMENTS 6,477,152 B1 * 11/2002 Hiett ............................ 370/316
7,746,828 B2 * 6/2010 Jalali ............................ 370/334
2008/0106476 A1 * 5/2008 Tran et al. .................... 343/702

* cited by examiner

*Primary Examiner* — Vladimir Magloire
*Assistant Examiner* — Babar Sarwar
(74) *Attorney, Agent, or Firm* — Donna P. Suchy; Daniel M. Barbieri

(57) ABSTRACT

The present invention is directed to an antenna system. The antenna system may include a first antenna and a second antenna. The antenna system may further include a first LRU connected to the first antenna, and a second LRU connected to the second antenna. The antenna system may further include a router, said router being connected to the first LRU, the second LRU and a communication system, the communication system being remotely located from the antenna system. The router may be configured for receiving a plurality of concurrent (ex.—simultaneous) communication control inputs from the communication system and may selectively route the received communication control inputs to the LRUs. The LRUs may, based upon the received communication control inputs establish LRU settings for causing the antennas to transmit and/or receive communications in accordance with said communication control inputs.

13 Claims, 4 Drawing Sheets

ANTENNA FUNCTIONALITY MANAGEMENT ROUTER CONTROLLING THE TRANSMIT-RECEIVE MODES OF MULTIPLE ANTENNAS

FIELD OF THE INVENTION

The present invention relates to the field of antenna technology and particularly to a system and method for antenna functionality management.

BACKGROUND OF THE INVENTION

Currently available antenna platforms (ex.—antenna systems) provide spatial diversity with one channel or thread allocated to a dedicated antenna element (ex—federated channel inputs). However, such antenna systems are inefficient, cumbersome, and do not provide time or frequency diversity.

Thus, it would be desirable to provide an antenna system and a method for managing antenna functionality via said antenna system which obviates the problems associated with currently available antenna systems.

SUMMARY OF THE INVENTION

Accordingly, an embodiment of the present invention is directed to an antenna system, including: a first antenna and a second antenna; a first processing unit and a second processing unit, the first processing unit being connected to the first antenna, the second processing unit being connected to the second antenna; and a router, the router being connected to the first processing unit and the second processing unit, the router configured for being connected to a communication system, the router being further configured for receiving a plurality of concurrent communication control inputs from the communication system, the router being further configured for selectively routing the received concurrent communication control inputs to the first processing unit and the second processing unit, wherein the first processing unit and the second processing unit are configured, based upon the received concurrent communication control inputs, for establishing settings of the first processing unit and the second processing unit for causing the first antenna and the second antenna to at least one of: transmit communications and receive communications.

A further embodiment of the present invention is directed to a method for managing antenna functionality via an antenna system, said method including: receiving a plurality of concurrent communication control inputs at a router of the antenna system; comparing said plurality of received concurrent communication control inputs to a set of routing rules implemented by said router; based upon the set of routing rules, directing a first concurrent communication control input included in the plurality of received concurrent communication control inputs to a first LRU of the antenna system; based upon the set of routing rules, directing a second concurrent communication control input included in the plurality of received concurrent communication control inputs to a second LRU of the antenna system; based upon the set of routing rules, directing a third concurrent communication control input included in the plurality of received concurrent communication control inputs to the second LRU of the antenna system; establishing a setting of the first LRU based upon the first concurrent communication control input for causing a first antenna of the antenna system to perform a communication function based upon the first concurrent communication control input; establishing a setting of the second LRU based upon the second concurrent communication control input for causing a second antenna of the antenna system to perform a communication function based upon the second concurrent communication input; establishing a setting of the second LRU based upon the third concurrent communication control input for causing the second antenna to perform a communication function based upon the third concurrent communication control input, wherein the first concurrent communication control input is a transmit communication control input, the second concurrent communication control input is a receive communication control input, and the third concurrent communication control input is a receive communication control input.

A still further embodiment of the present invention is directed to a non-transitory computer-readable medium having computer-executable instructions for performing a method for managing antenna functionality via an antenna system, said method including: receiving a plurality of concurrent communication control inputs at a router of the antenna system; comparing said plurality of received concurrent communication control inputs to a set of routing rules implemented by said router; based upon the set of routing rules, directing a first concurrent communication control input included in the plurality of received concurrent communication control inputs to a first LRU of the antenna system; based upon the set of routing rules, directing a second concurrent communication control input included in the plurality of received concurrent communication control inputs to a second LRU of the antenna system; based upon the set of routing rules, directing a third concurrent communication control input included in the plurality of received concurrent communication control inputs to the second LRU of the antenna system, wherein the first concurrent communication control input is a transmit thread, the second concurrent communication control input is a receive thread, and the third concurrent communication control input is a receive thread.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Currently available antenna platforms (ex.—antenna systems) provide spatial diversity with one channel or thread allocated to a dedicated antenna element (ex—federated channel inputs). However, currently available antenna systems do not provide time diversity. Further, currently available antenna systems do not provide sufficient frequency diversity to allow for a practical filter solution. The following exemplary embodiments of the antenna system disclosed herein address the above-referenced drawbacks of currently available antenna platforms.

Figure 1:
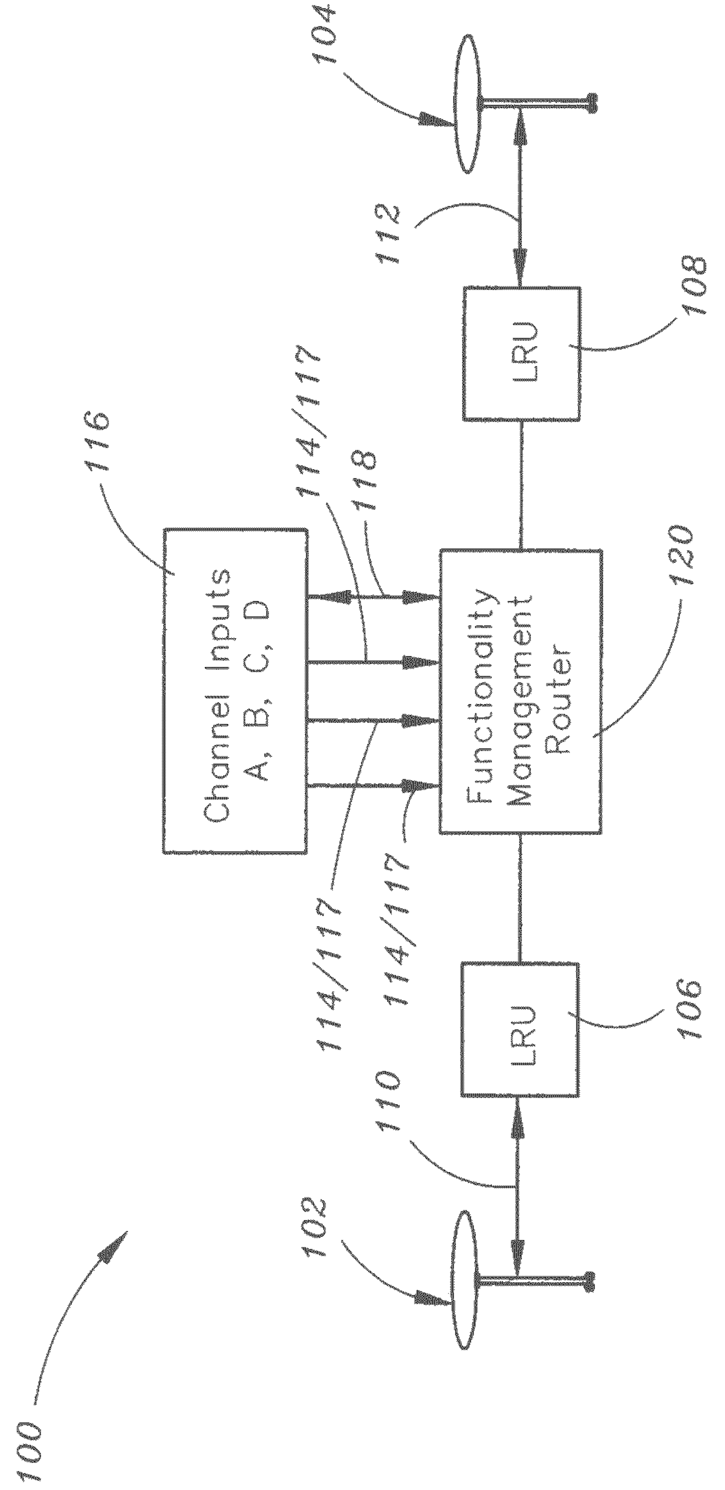
FIG. 1 is a block diagram schematic of an antenna system in accordance with an exemplary embodiment of the present invention.

Referring to FIG. 1, an antenna system in accordance with an exemplary embodiment of the present invention is shown. In exemplary embodiments of the present invention, the antenna system 100 may include a plurality of antennas. For example, the antenna system 100 may include two antennas (ex.—a first antenna 102 and a second antenna 104), as shown in FIG. 1. In further embodiments of the present invention, each antenna (ex.—102, 104) included in the plurality of antennas may be configured for transmitting and/or receiving signals. In at least one embodiment of the present invention, each antenna (ex.—102, 104) included in the plurality of antennas may be configured for being connected to an exterior surface of a pressure vessel (ex.—mounted upon an exterior airframe surface of an aircraft).

In current exemplary embodiments of the present invention, the antenna system 100 may further include one or more processing units (ex.—Line Replaceable Units (LRUs)), the one or more processing units being connected to the plurality of antennas. For instance, as shown in FIG. 1, the antenna system 100 may include two LRUs (ex.—a first LRU 106 and a second LRU 108). In exemplary embodiments of the present invention the LRUs (106, 108) may be located in an interior area of a pressure vessel (ex.—located in an avionics bay of an aircraft). For example, the LRUs (106, 108) may be modular components suitable for implementation on-board an aircraft, ship or spacecraft which are designed to be replaced quickly at an operating location. Further, the LRUs (106, 108) may be sealed units (ex.—black boxes), such as a radio or other auxiliary equipment. In further embodiments of the present invention, the first LRU 106 may be connected to the first antenna 102, and the second LRU 108 may be connected to the second antenna 104. For example, the first LRU 106 may be connected to the first antenna 102 via a first bi-directional thread data path (ex.—provided via a first Radio Frequency coaxial cable 110, and the second LRU 108 may be connected to the second antenna 104 via a second bi-directional thread data path (ex.—provided via a second RF coaxial cable 112, such that the first LRU 106 may be a dedicated LRU for the first antenna 102, and the second LRU 108 may be a dedicated LRU for the second antenna 104. In still further embodiments of the present invention, the plurality of LRUs (106, 108) may be remotely located from the plurality of antennas (102, 104). For instance, as mentioned above, the plurality of LRUs (106, 108) may be located in an interior of a pressure vessel (ex.—in an avionics bay of an aircraft), while the plurality of antennas (102, 104), as mentioned above, may be mounted to an exterior surface of the body (ex.—frame) of the pressure vessel (ex.—aircraft).

In exemplary embodiments of the present invention, the antenna system 100 may be configured for receiving a plurality of communication control inputs 114 (ex.—channel inputs) from a communication system 116, the communication system 116 being configured for being connected (ex.—communicatively coupled) to the antenna system 100 via a plurality of communication control input data links 117 and a thread data path 118. In further embodiments of the present invention, the plurality of communication control inputs 114 may be provided from the communication system 116 to the antenna system 100 via the communication control input data links 117. In still further embodiments of the present invention, the communication system 116 may be remotely located from the antenna system 100. For example, the communication system 116 may include a plurality of flight deck navigation system components, flight deck radio components, or the like located in a cockpit of the aircraft upon which the antenna system 100 is being implemented, said components being configured for providing the communication control inputs 114 to the antenna system 100.

In current exemplary embodiments of the present invention, the antenna system 100 may include a functionality management router 120. In further embodiments of the present invention, the functionality management router 120 may be connected to (ex.—connected between) the LRUs (106, 108) and the communication system 116. In still further embodiments of the present invention, the functionality management router 120 may be configured for receiving the communication control inputs 114 from the communication system 116 (ex.—via a first interface of the router 120).

In exemplary embodiments of the present invention, the communication control inputs 114 received by the router 120 may each include instructions (ex.—threads) which indicate the type of function that the antenna system 100 is to perform. For instance, a first type of thread (ex.—a transmit thread) may instruct the antenna system 100 to transmit a communication via an antenna of the antenna system 100, while a second type of thread (ex.—a receive thread) may instruct the antenna system 100 to receive a communication via an antenna of the antenna system 100. In exemplary embodiments of the present invention, the communication(s) to be transmitted from and/or received by the antennas (102, 104) based upon the communication control inputs 114 may be transmitted to and/or received from a system which is remotely located from the antenna system 100, such as a radio system located at an air traffic control tower. For example, a communication control input 114 may be received from a radio system of a radio being used by a flight crew member (ex.—the communication system 116) of the aircraft upon which the antenna system 100 is implemented. Such communication control input 114 may be a transmit communication control input (which provides instructions to transmit a communication via an antenna of the antenna system 100) or a receive communication control input (which provides instructions to receive a communication via an antenna of the antenna system 100) to cause the antenna system 100 to communicate (based on the communication control inputs 114) via said antenna system 100 with the remote system (ex.—the air traffic control radio system) to allow the flight crew member on the aircraft upon which the antenna system 100 is implemented to communicate via said communication system 116 with the air traffic control radio system. In further embodiments of the present invention, the communication control inputs 114 received by the router 120 may be concurrent (ex.—simultaneous) communication control inputs 114, such that said concurrent communication control inputs may be concurrently (ex.—simultaneously) received by the router 120 and/or may direct the antenna system 100 to perform functions (exs.—transmit, receive) concurrently (ex.—simultaneously).

In current exemplary embodiments of the present invention, the router 120 may be configured to selectively route or forward the communication control inputs 114 to the LRUs (106, 108). Based upon the communication control inputs 114 received from the router 120, the LRUs (106, 108) may be configured for causing the antennas (102, 104) to transmit or receive communications. For instance, each LRU (106, 108) may include one or more switches, and based upon the communication control inputs, the LRUs (106, 108) may establish themselves (ex.—may establish a switch(es) of the LRUs) into one of multiple possible settings (ex.—switch settings) of the LRUs (106, 108) for causing the antennas (102, 104) to transmit or receive communications. In exemplary embodiments of the present invention, said routing may be performed by the router 120 according to a routing scheme or set of routing rules implemented by the router 120. The routing scheme or routing rules may be based upon the number of antennas being implemented in the antenna system 100, the number of concurrent communication control inputs 114 received, and the type of communication control inputs 114 (ex.—transmit or receive) which are received. In further embodiments of the present invention, the router 120 may include a processor configured for processing the received communication control inputs 114. In still further embodiments of the present invention, the router 120 may include a memory, said memory being connected to the processor of the router 120, said memory being further configured for storing data (exs.—routing scheme data, routing rules). In further embodiments, the router 120 may include various hardware (ex.—switches) and/or software for carrying out and providing the routing and functionality management capabilities described herein. For example, the router 120 may include software which runs on the processor of the router 120 for carrying out and providing the routing and functionality management capabilities described herein.

As mentioned above, the functionality management router 120 of the antenna system 100 may implement a routing scheme which routes the communication control inputs 114 to the LRUs (106, 108) of the antenna system 100 based upon one or more various factors, such as the number of antennas being implemented in the antenna system 100, the number of concurrent communication control inputs 114 received, and the type of communication control inputs 114 (ex.—transmit or receive) which are received. For example, in one or more embodiments of the present invention (as mentioned above), the antenna system 100 may implement as few as two antennas (102, 104), the first antenna 102 being connected to the first LRU 106, the second antenna 104 being connected to the second LRU 108. For exemplary purposes, the routing scenarios described below will illustrate exemplary communication control input routing schemes (exs.—communication control input routing mechanisms, communication control input routing rules) applied by the router 120 when said router 120 is implemented in an embodiment of the antenna system 100 in which the antenna system 100 includes only two antennas (102, 104), the two antennas (102, 104) being connected to two corresponding LRUs (106, 108) respectively. In alternative embodiments of the present invention, the antenna system 100 may implement varying numbers of antennas and LRUs, and the router 120 may correspondingly employ varying communication control input routing schemes based on the varying numbers of components (exs.—antennas, LRUs).

In embodiments of the antenna system 100 as described above, in which the antenna system 100 includes only two antennas (102, 104), the first antenna 102 being connected to the first LRU 106, the second antenna 104 being connected to the second LRU 108, the functionality management router 120 of the antenna system 100 may implement routing schemes as described below.

In a first scenario, when two concurrent (ex.—simultaneous) communication control inputs 114 are received by the router 120, the router 120 may route one of the two communication control inputs (ex.—communication control input "A") to the first LRU 106 and may route the other of the two communication control inputs (ex.—communication control input "B") to the second LRU 108. The first LRU 106 may receive communication control input "A" and may then establish a setting (ex.—maintain or alter a switch setting) of the first LRU 106 based upon communication control input "A" for causing the first antenna 102 to perform a transmit function in accordance with communication control input "A" (if communication control input "A" is a transmit communication control input) or a receive function in accordance with communication control input "A" (if communication control input "A" is a receive communication control input). Further, the second LRU 108 may receive communication control input "B" and may then establish a setting (ex.—maintain or alter a switch setting) of the second LRU 108 based upon communication control input "B" for causing the second antenna 104 to perform a transmit function in accordance with communication control input "B" (if communication control input "B" is a transmit communication control input) or a receive function in accordance with communication control input "B" (if communication control input "B" is a receive communication control input).

In a further scenario, when three concurrent (ex.—simultaneous) communication control inputs 114 are received by the router 120, two of the communication control inputs may be routed to one of the two LRUs, while the third communication control input is routed to the other of the two LRUs, thereby causing the LRUs (106, 108) to establish LRU settings based upon the received communication control inputs for causing the antennas (102, 104) to perform communication (exs.—transmit or receive) functions based upon the received communication control inputs. In exemplary embodiments, if only one of the three communication control inputs 114 is a transmit communication control input, then the transmit communication control input may be routed to the first LRU 106 and the other two communication control inputs are routed to the second LRU 108. Further, the first LRU 106 may receive the transmit communication control input from the router 120 and may then establish a setting of the first LRU 106 based upon the received transmit communication control input for causing the first antenna 102 to perform a transmit function (ex.—to transmit communication(s) to a remotely-located system, such as a air traffic control tower radio system, via the first antenna). Further, the second LRU 108 may receive the other two communication control inputs (ex.—two receive communication control inputs) from the router 120 and may establish a setting(s) of the second LRU 108 based upon the two receive communication control inputs for causing the second antenna 104 to perform two receive functions (ex.—to receive communication(s) from a remotely-located system(s), such as an air traffic control radio control tower system, via the second antenna).

In a further scenario, when four concurrent (ex.—simultaneous) communication control inputs 114 are received by the router 120, the communication control inputs 114 may be routed to the LRUs (106, 108) in any one of various combinations (exs.—two communication control inputs each to the first and second LRUs, one communication control input to one of the two LRUs, three communication control inputs to the other of the two LRUs, etc.), thereby causing the LRUs (106, 108) to establish LRU settings based upon the received communication control inputs for causing the antennas (102, 104) to perform communication (exs.—transmit or receive) functions. In exemplary embodiments, if only one of the four communication control inputs 114 is a transmit communication control input, then the transmit communication control input may be routed to the first LRU 106 and the other three communication control inputs are routed to the second LRU 108. Further, the first LRU 106 may receive the transmit communication control input from the router 120 and may then establish a setting of the first LRU 106 based upon the received transmit communication control input for causing the first antenna 102 to perform a transmit function. Further, the second LRU 108 may receive the other three communication control inputs (ex.—three receive communication control inputs) from the router 120 and may establish a setting of the second LRU 108 based upon the three receive communication control inputs for causing the second antenna 104 to perform three receive functions.

Figure 2:
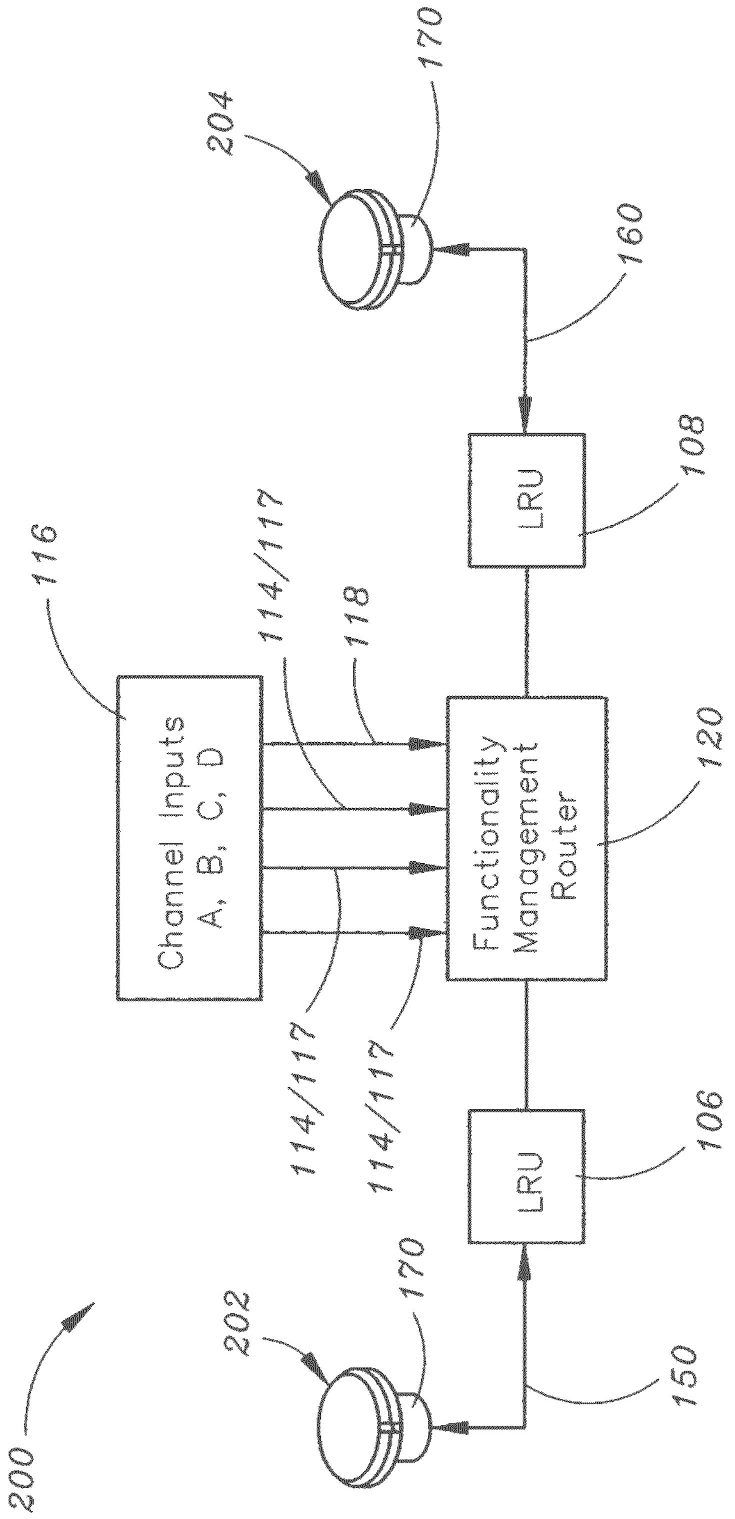
FIG. 2 is a block diagram schematic of an antenna system in accordance with an alternative exemplary embodiment of the present invention.

Referring to FIG. 2, an antenna system 200 in accordance with an alternative exemplary embodiment of the present invention is shown. The antenna system 200 shown in FIG. 2 may be constructed in a similar manner and may function in a similar manner as the antenna system 100 described above, except that in the antenna system 200 shown in FIG. 2, the first LRU 106 and the second LRU 108 may be connected to a first antenna 202 and a second antenna 204 (ex.—a first L-band antenna 202 and a second L-band antenna 204) respectively via fiber optical cables (150, 160). Implementation of fiber optical cables rather than RF coaxial cables, may allow the antenna system 200 of FIG. 2 to provide a lighter weight alternative to the system 100 of FIG. 1. Further, the antenna system 200 shown in FIG. 2 may include remote antenna electronics 170, said remote antenna electronics 170 being connected to the antennas (202, 204) and the LRUs (106, 108) of said antenna system 200, said remote antenna electronics 170 being configured for supporting (ex.—facilitating) use of the fiber optical cables (150, 160) with the antennas (202, 204) and for supporting functionality of the antennas (202, 204). Still further, the remote electronics may be remotely located from the LRUs (106, 108) such that they are proximal to the antennas (202, 204) (ex.—mounted to an exterior airframe surface of an aircraft). Although the remote antenna electronics 170 may face a harsher environment on the exterior airframe surface than if they were located in the avionics bay, the antenna system 200 shown in FIG. 2 may be advantageous in that said system 200 may promote reduced loss and variation (ex.—little or no RF cable loss).

Figure 4:
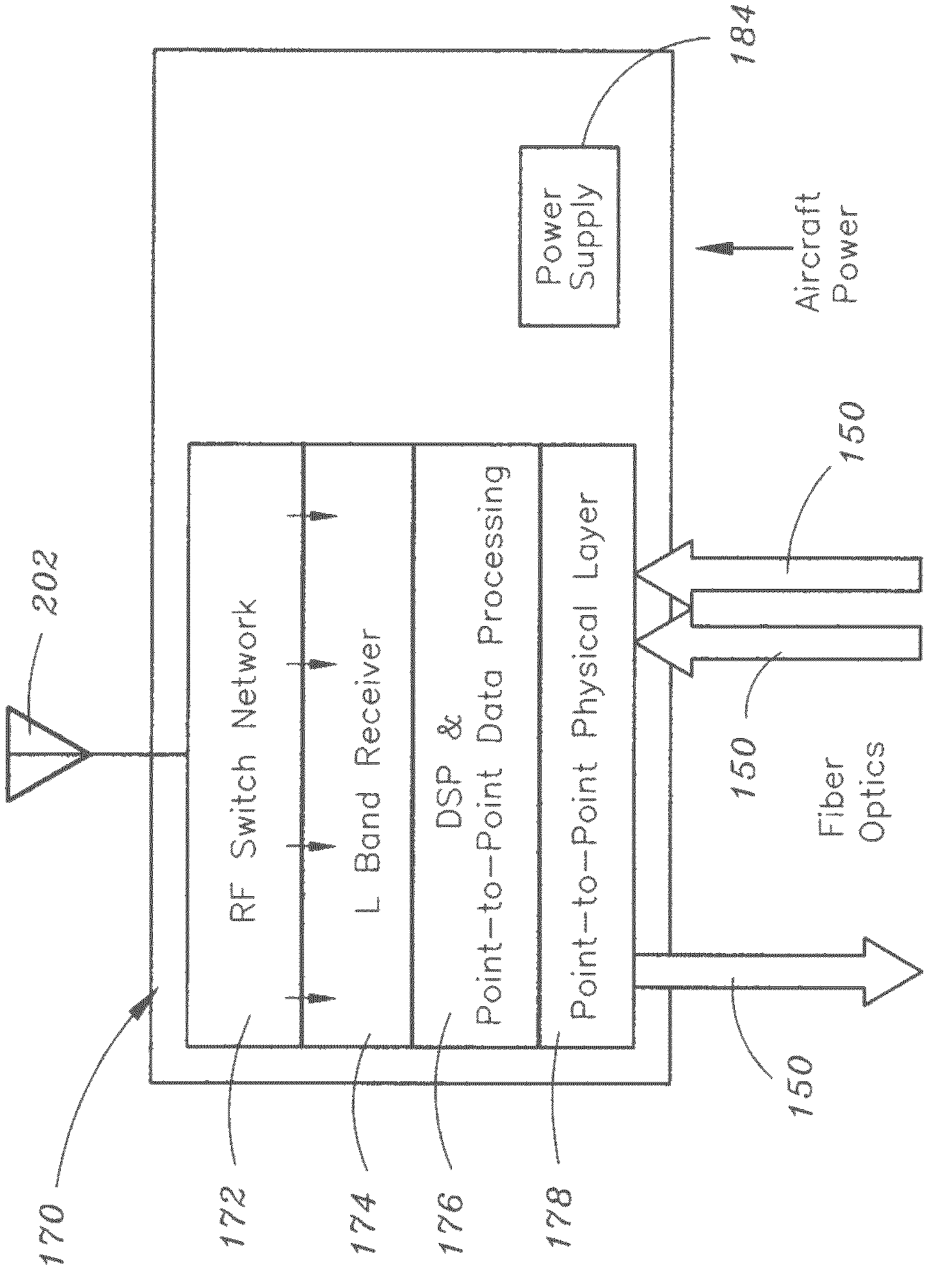
FIG. 4 is a block diagram schematic of antenna remote electronics of an antenna included in the antenna system depicted in FIG. 2 in accordance with a further exemplary embodiment of the present invention.

FIG. 4 is a block diagram schematic illustrating the remote electronics 170 in accordance with an exemplary embodiment of the present invention. The remote electronics 170 may include a switch network 172 (ex.—an RF switch network 172), the switch network 172 being connected to the antenna 202. The remote electronics may further include a receiver 174 (ex.—an L-band receiver 174 if the antenna 202 is an L-band antenna), said receiver 174 being connected to the RF switch network 172. In further embodiments of the present invention, the remote electronics 170 may further include a data processing unit 176 (ex.—a Data Signal Processing (DSP) and Point-to-Point Data Processing unit 176), said data processing unit 176 being connected to the receiver 174. In still further embodiments of the present invention, the remote electronics 170 may further include a Point-to-Point Physical layer 178, the Point-to-Point Physical layer 178 being connected to the data processing unit 176 and the fiber optic cable(s) 150. In still further embodiments, the remote electronics 170 may further include a power supply 184.

In current exemplary embodiments of the present invention, by implementing the functionality management router 120 as described above, the exemplary embodiments of the antenna system (100, 200) of the present invention disclosed herein may promote increased efficiency over currently available antenna systems. For instance, in currently available antenna systems functions are federated, with dedicated LRUs and antennas. In contrast, in the antenna system embodiments described herein, the LRUs (106, 108) may be multi-function LRUs. In further embodiments of the present invention, the antenna systems (100, 200) of the present invention disclosed herein may cause legacy waveforms (which otherwise may not be designed to work in a coordinated manner) to share common antenna resources, thereby promoting an improved system topology over currently available antenna systems. In still further embodiments of the present invention, the antenna systems (100, 200) of the present invention disclosed herein, by providing the above-described multi-functionality, may allow for a reduction in the number of antennas being implemented compared to currently available antenna systems. For instance, the antenna systems (100, 200) of the present invention disclosed herein may each implement as few as two antennas, such as a top antenna mounted to a top surface of an airframe or fuselage of an aircraft (ex.—on a top portion or top side of an aircraft) and a bottom antenna mounted to a bottom surface of an airframe or fuselage of an aircraft (ex.—on a bottom portion or bottom side of the aircraft, the bottom side being located generally opposite the top side). By promoting a reduction in the number of antennas which may be implemented, the antenna systems (100, 200) of the present invention may provide the following advantages over currently available antenna systems: lighter weight antenna system; reduced wind drag (ex.—when implemented on an aircraft); and a reduced maintenance system. For instance, when implemented on an aircraft, the antenna systems (100, 200) of the present invention, because they may implement fewer antennas, may promote a reduction in the number of ports or holes that need to be formed in the airframe of the aircraft to accommodate said antennas. Thus, there may be fewer pressure seals to maintain. Further, the antenna systems (100, 200) of the present invention may promote ease of replacement or maintenance without having to break said pressure seals.

In further embodiments of the present invention, the antenna systems (100, 200) of the present invention may promote improved (ex.—more efficient) handling of simultaneous communication control inputs over currently available antenna systems and may do so without requiring time scheduling.

In still further embodiments of the present invention, various types of antennas (102, 104, 202, 204) may be used in the antenna systems (100, 200) disclosed herein. For example, the types of antennas which may be implemented in the antenna systems (100, 200) of the present invention may include, but are not limited to the following: Traffic Alert and Collision Avoidance System (TCAS) antennas; Distance Measuring Equipment (DME) antennas; Global Positioning System (GPS) antennas; Emergency Location Transmitter (ELT) antennas; Very High Frequency Omni-directional Range (VOR) antennas; High Frequency (HF) antennas; Automatic Direction Finder (ADF) antennas; Very High Frequency (VHF) antennas (exs.—VHF COM, VHF NAV); Glide Slope antennas; Weather Radar (WXR) antennas; Marker Beacon (MB) antennas; Radio Altimeter antennas; Localizer antennas; Mode S1 ATC (Air Traffic Control) antennas; Mode S2 ATC antennas; Universal Access Transceiver (UAT) antennas; XM Satellite™ antennas; Wi-Fi™ antennas; Instrument Landing System (ILS) antennas; Ultra-High Frequency (UHF) antennas; Transponder Automatic Dependent Surveillance Broadcast (XPDR/ADS-B or TPR/ADS-B) antennas; L-band antennas; RTAWS antennas, Synthetic Vision System (SVS) antennas, and/or X-band antennas. Examples of the types of aircraft upon which the antenna systems (100, 200) of the present invention may be implemented may include, but are not limited to Boeing 737 Next Generation (737 NG) aircraft and/or Airbus A340 aircraft.

Figure 3:
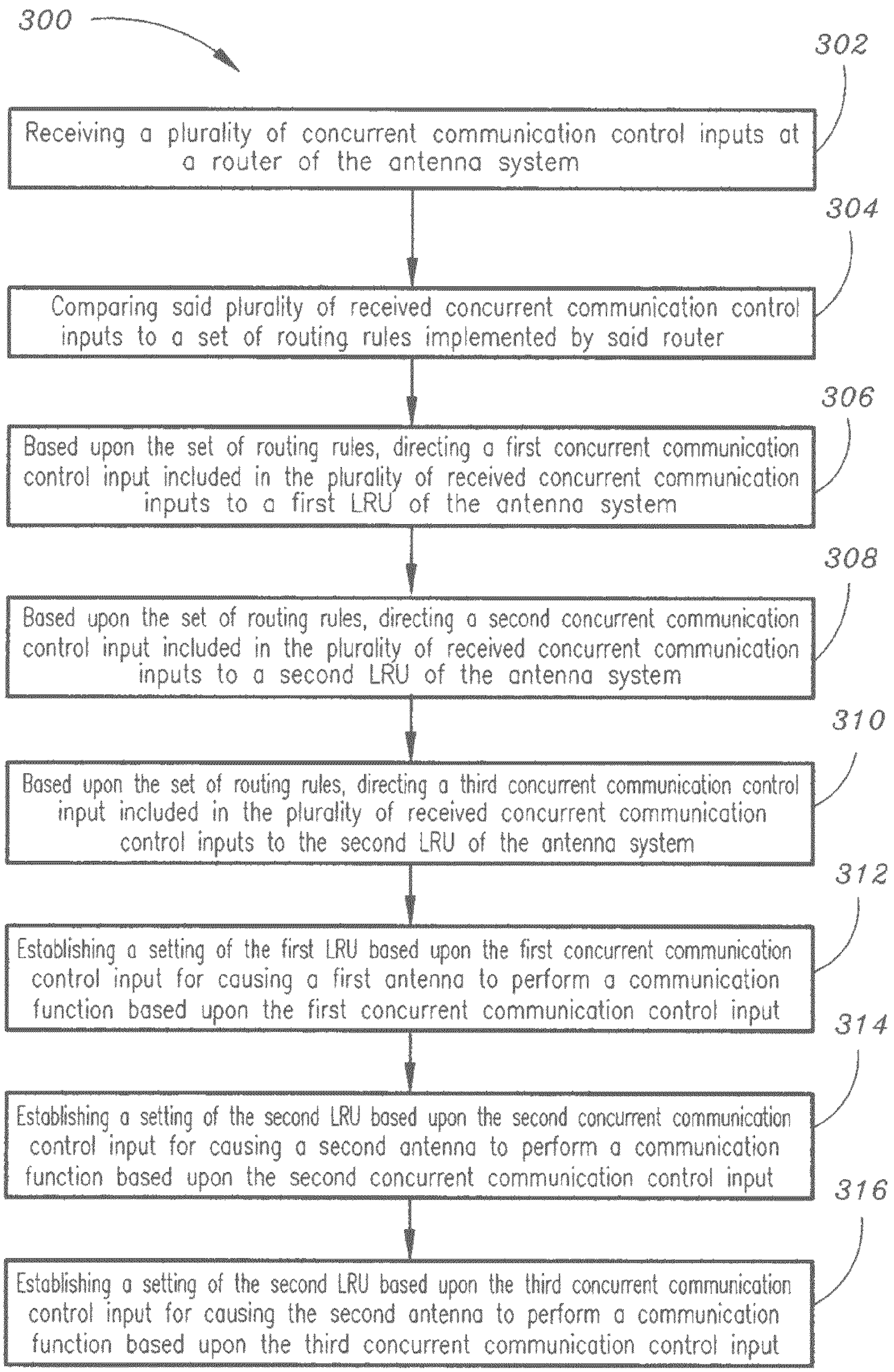
FIG. 3 is a flow chart depiction of a method for managing antenna functionality via the antenna system of FIG. 1 in accordance with a further exemplary embodiment of the present invention.

Referring to FIG. 3, a flowchart depicting a method for managing antenna functionality via an antenna system in accordance with an exemplary embodiment of the present invention is shown. In exemplary embodiments of the present invention, the method 300 may include the step of receiving a plurality of concurrent communication control inputs at a router of the antenna system 302. The method 300 may further include the step of comparing said plurality of received concurrent communication control inputs to a set of routing rules implemented by said router 304. The method 300 may further include the step of, based upon the set of routing rules, directing a first concurrent communication control input included in the plurality of received concurrent communication control inputs to a first LRU of the antenna system 306. The method 300 may further include the step of, based upon the set of routing rules, directing a second concurrent communication control input included in the plurality of received concurrent communication control inputs to a second LRU of the antenna system 308. The method 300 may further include the step of, based upon the set of routing rules, directing a third concurrent communication control input included in the plurality of received concurrent communication control inputs to the second LRU of the antenna system 310. The method 300 may further include the step of establishing a setting of the first LRU based upon the first concurrent communication control input for causing a first antenna of the antenna system to perform a communication function based upon the first concurrent communication control input 312. The method 300 may further include the step of establishing a setting of the second LRU based upon the second concurrent communication control input for causing a second antenna of the antenna system to perform a communication function based upon the second concurrent communication control input 314. The method 300 may further include the step of establishing a setting of the second LRU based upon the third concurrent communication control input for causing the second antenna to perform a communication function based upon the third concurrent communication control input 316. In an exemplary embodiment of the present invention, the first concurrent communication control input may be a transmit communication control input, while the second concurrent communication control input and third concurrent communication control input may each be receive communication control inputs, thus the antenna system 100 of the present invention may route the transmit communication control input in such a manner that it is directed to one LRU, while the receive communication control inputs are directed to the other LRU, thereby ensuring that the transmit communication control input becomes the independent antenna function. In further embodiments of the present invention, algorithms may be implemented by the antenna systems (100,200) for carrying out the selective routing functions described herein.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An antenna system, comprising:

a first antenna and a second antenna;

a first processing unit and a second processing unit, the first processing unit configured for connection to the first antenna, the second processing unit configured for connection to the second antenna; and a router, the router configured for connection to the first processing unit and the second processing unit, the router configured for connection to a communication system, the router further configured for receiving a plurality of concurrent communication control inputs from the communication system, wherein the plurality of concurrent communication control inputs includes at least three concurrent communication control inputs, the router further configured for selectively routing the received concurrent communication control inputs to the first processing unit and the second processing unit, wherein the router is further configured for routing at least two received concurrent communication control inputs to a particular processing unit of the first processing unit and the second processing unit, wherein the router selectively routes the received concurrent communication control inputs based upon: a number of antennas being implemented in the antenna system; a number of concurrent communication control inputs received by the antenna system; and a type of concurrent communication control input received by the antenna system, wherein the first processing unit and the second processing unit are configured, based upon the received concurrent communication control inputs, for establishing settings of the first processing unit and the second processing unit for causing the first antenna and the second antenna to concurrently transmit and receive communications.

2. An antenna system as claimed in claim 1, wherein the first processing unit and the second processing unit are Line Replaceable Units (LRUs).

3. An antenna system as claimed in claim 1, wherein the antenna system is configured for implementation on-board an aircraft.

4. An antenna system as claimed in claim 1, wherein the antenna system is implemented on a pressure vessel, the first antenna and the second antenna configured for location on an exterior surface of the pressure vessel, the first processing unit and the second processing unit configured for location in an interior region of the pressure vessel.

5. An antenna system as claimed in claim 1, wherein the first antenna and the second antenna are configured for connection to the first processing unit and the second processing unit via RF coaxial cable.

6. An antenna system as claimed in claim 1, wherein the first antenna and the second antenna are configured for connection to the first processing unit and the second processing unit via fiber optical cable.

7. An antenna system as claimed in claim 6, wherein the antenna system further includes remote antenna electronics, said remote antenna electronics configured for connection to the first antenna and the second antenna, said remote antenna electronics further configured for facilitating use of the fiber optical cable with the first antenna and the second antenna.

8. A method for managing antenna functionality via an antenna system, said method comprising:

receiving a plurality of concurrent communication control inputs at a router of the antenna system, the antenna system including a first antenna processing unit and a second antenna processing unit, wherein the plurality of concurrent communication control inputs includes at least three concurrent communication control inputs;

comparing said plurality of concurrent communication control inputs to a set of routing rules implemented by said router;

based upon the set of routing rules, directing a first concurrent receive communication control input included in the plurality of concurrent communication control inputs to the first antenna processing unit of the antenna system;

based upon the set of routing rules, directing a second concurrent transmit communication control input included in the plurality of concurrent communication control inputs to the second antenna processing unit of the antenna system; and based upon the set of routing rules, directing a third concurrent communication control input included in the plurality of concurrent communication control inputs to the second antenna processing unit of the antenna system, wherein the router selectively routes the received plurality of concurrent communication control inputs based upon: a number of antennas being implemented in the antenna system; a number of concurrent communication control inputs received by the antenna system; and a type of concurrent communication control input received by the antenna system.

9. A method as claimed in claim 8, further comprising:

establishing a setting of the first antenna processing unit based upon the first concurrent receive communication control input for causing a first antenna to perform a communication function based upon the first concurrent communication receive control input.

10. A method as claimed in claim 9, further comprising:

establishing a setting of the second antenna processing unit based upon the second transmit concurrent communication control input for causing a second antenna of the antenna system to perform a communication function based upon the second concurrent transmit communication control input.

11. A method as claimed in claim 10, further comprising:

establishing a setting of the second antenna processing unit based upon the third concurrent communication control input for causing the second antenna of the antenna system to perform a communication function based upon the third concurrent communication control input.

12. A method as claimed in claim 11, wherein the third concurrent communication control input is a receive communication control input.

13. A non-transitory computer-readable medium having computer-executable instructions for performing a method for managing antenna functionality via an antenna system, said method comprising:

receiving a plurality of concurrent communication control inputs at a router of the antenna system, the antenna system including a first antenna processing unit and a second antenna processing unit, wherein the plurality of concurrent communication control inputs includes at least three concurrent communication control inputs;

comparing said plurality of concurrent communication control inputs to a set of routing rules implemented by said router;

based upon the set of routing rules, directing a first concurrent receive communication control input included in the plurality of concurrent communication control inputs to the first antenna processing unit of the antenna system;

based upon the set of routing rules, directing a second concurrent transmit communication control input included in the plurality of concurrent communication control inputs to the second antenna processing unit of the antenna-system; and based upon the set of routing rules, directing a third concurrent communication control input included in the plurality of concurrent communication control inputs to the second antenna processing unit of the antenna system, wherein the router selectively routes the received plurality of concurrent communication control inputs based upon: a number of antennas being implemented in the antenna system; a number of concurrent communication control inputs received by the antenna system; and a type of concurrent communication control input received by the antenna system.

* * * * *